United States Patent [19]
Woods

[11] Patent Number: 5,516,139
[45] Date of Patent: May 14, 1996

[54] GUIDE ASSEMBLY

[76] Inventor: Lawrence A. Woods, Rte. 3, Box 273, Beeville, Tex. 78102

[21] Appl. No.: 390,382

[22] Filed: Feb. 17, 1995

[51] Int. Cl.⁶ .................................................. B60D 1/12
[52] U.S. Cl. .................................... 280/477; 280/507
[58] Field of Search ........................... 280/477, 478.1, 280/507, 511

[56] References Cited

U.S. PATENT DOCUMENTS

| | | | |
|---|---|---|---|
| 942,764 | 12/1909 | Westra | 280/477 |
| 1,626,993 | 10/1926 | Williams | 280/477 |
| 2,409,399 | 10/1946 | Solon | 280/477 |
| 2,571,349 | 10/1951 | Eckles | 280/507 X |
| 2,697,618 | 12/1954 | Hulstedt | 280/515 |
| 2,705,157 | 3/1955 | Dail | 280/515 |
| 3,037,794 | 6/1962 | Richman, Jr. | 280/477 X |
| 3,047,839 | 7/1962 | Brown | 200/52 R X |
| 3,393,924 | 7/1968 | Silver | 280/461.1 |
| 3,420,549 | 1/1969 | Robinson | 280/477 |
| 3,522,958 | 8/1970 | Lusignan | 280/511 |
| 3,747,958 | 7/1973 | Hackett | 280/477 |
| 3,884,055 | 5/1975 | Vuillemot | 280/507 X |
| 3,944,259 | 3/1976 | Miller | 280/477 X |
| 4,183,548 | 1/1980 | Schneckloth | 280/477 X |
| 4,226,438 | 10/1980 | Collins | 280/477 X |
| 4,417,748 | 11/1983 | Dortch | 280/477 |
| 4,781,394 | 11/1988 | Schwarz et al. | 280/477 |
| 4,840,392 | 6/1989 | Baskett | 280/477 |
| 4,844,496 | 7/1989 | Webb et al. | 280/477 |
| 4,854,604 | 8/1989 | Stallsworth | 280/477 |
| 4,871,184 | 10/1989 | Johnson | 280/477 |
| 4,871,185 | 10/1989 | Chakroff et al. | 280/477 |
| 4,974,866 | 12/1990 | Morgan | 280/477 |

FOREIGN PATENT DOCUMENTS

| | | | |
|---|---|---|---|
| 0537062 | 10/1931 | Germany | 280/477 |
| 0558921 | 9/1932 | Germany | 280/477 |

Primary Examiner—Margaret A. Focarino
Assistant Examiner—F. Zeender
Attorney, Agent, or Firm—Frank S. Vaden, III; Marvin B. Eickenroht; Jennings B. Thompson

[57] ABSTRACT

There is disclosed a guide assembly for use in attaching a towed vehicle having a forwardly extending tongue with a socket on its inner end to a ball mounted on the bumper of a towing vehicle to fit the socket, including a housing having bottom, side and end walls, with the bottom wall fixedly mounted on the ball mounting for rotation about it, and springs which act between the ball mounting and the housing to yieldably urge the housing in opposite rotational directions about the vertical axis of the ball prior to as well as following attachment.

8 Claims, 3 Drawing Sheets

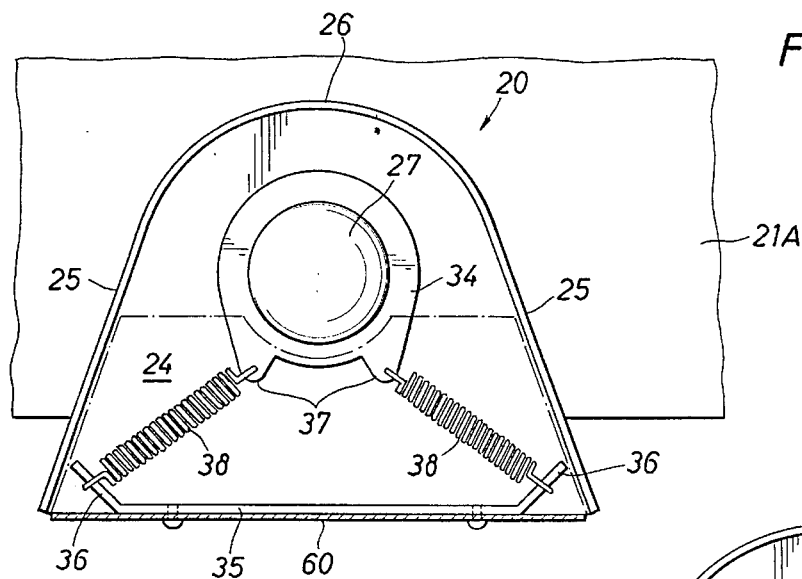
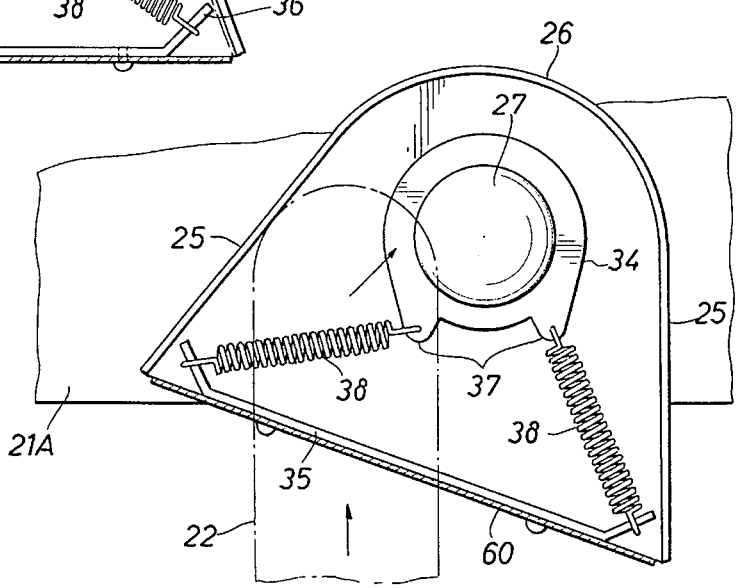
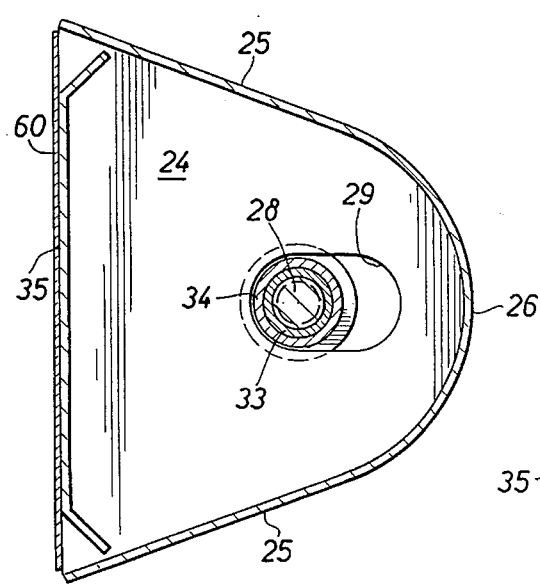
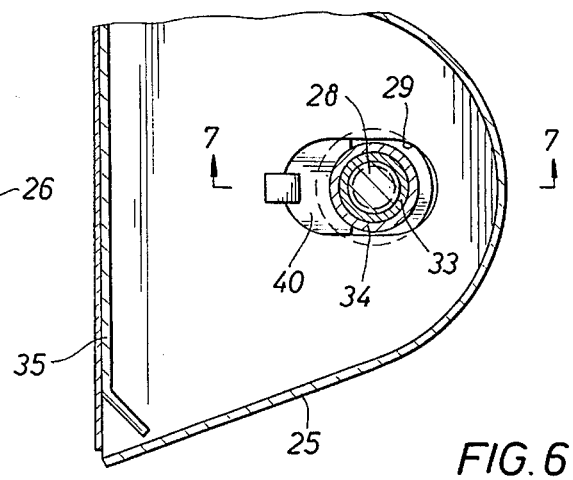

GUIDE ASSEMBLY

This invention relates generally to a trailer hitch for attaching a towed vehicle to the bumper of a towing vehicle. More particularly, it relates to improvements in an assembly for guiding a socket on the end of a forwardly extending tongue on the vehicle to be towed into a position over a ball on the bumper of the towing vehicle, whereby it may be attached thereto.

U.S. Pat. No. 4,781,394 shows a guide assembly of this general type which includes a generally "V" shaped housing having a bottom wall removably mounted on the bumper for rotating about the stem of a ball fixedly secured to the bumper, and side walls diverging rearwardly to intersect with an end wall facing the open front of the housing. More particularly, a spring member is mounted between the back side of the end wall of the housing and a vertical wall of the towing vehicle bumper so as to urge the housing in opposite rotational directions about the stem. Thus, in a relatively unstressed condition of the spring, the housing is yieldably held in a neutral position with its end wall generally behind the ball.

During attachment, a side wall of the housing will be engaged by the end of the tongue to guide it into the housing, despite initial misalignment, by sliding over the side wall into a position in which its socket is above the ball. More particularly, the housing is initially held in its aligned, neutral position by a pin received in aligned holes in the housing and bumper. Then, a cross bar is mounted from the side walls of the housing to extend generally above the end of the tongue so as to prevent displacement of the socket above the ball, and the pin is removed so that the housing is free to rotate about the stem as the tongue turns with the towing vehicle during travel. However, holding the housing in a fixed position during attachment runs the risk of damaging its side walls as the tongue on the towed vehicle is moved into the open front end of the housing.

The guide assembly of the aforementioned patent also includes a means for adjusting the position of the ball lengthwise of the housing, and thus toward and away from its rear wall, to accommodate the attachment of sockets spaced at varying lengths from the rear end of the tongue. However, such adjustment is enabled only by an eccentric mounting of the ball on the stem, so that the lengthwise adjustment may require that the ball be offset laterally from the stem axis which results in eccentric loading. Also the cross bar may be too low to hold down a tongue of one particular construction or too high to hold down a tongue of another construction.

Hence, it is an object of this invention to provide a guide assembly of this general type which is of such construction as to minimize the possibility of damaging its housing or other parts either prior to or after attachment of the towed vehicle.

Another object is to provide such a guide assembly in which the ball may be easily and quickly moved between and affixed in different positions lengthwise of the housing to accommodate tongues of differing construction.

Still another object is to provide such a guide assembly in which the socket may be prevented from displacement above the ball in the case of tongues of differing height and position lengthwise of the housing.

These and other objects are accomplished, in accordance with the illustrated embodiment of the present invention, by a guide assembly which, as in the prior assembly, includes a ball contoured to fit the socket and having means for fixedly mounting it on the bumper of the towing vehicle in position to fit within the socket on the end of the tongue of the towed vehicle, and a housing having a bottom wall supported on the bumper for rotation about the ball mounting means, upstanding, rearwardly diverging walls on opposite sides of the ball, and an end wall at the intersection of the side walls to the rear of the ball. However, as compared with the prior assembly, the assembly of the present invention further includes means which acts to yieldably urge the housing in opposite rotational directions about the vertical axis of the ball during as well as following attachment of the socket of the tongue to the ball. Consequently, upon initial engagement of the side wall of the housing with the tongue, the housing is free to rotate into a position in which the tongue slides over the side wall until the force of the spring returns the housing to its neutral position in which the socket is over the ball for attachment thereto. At the same time, following attachment, the springs permit the housing to be turned with respect to the towed vehicle during transport.

As illustrated, the ball mounting means includes a stem which extends vertically through a hole in the bumper, means such as a nut adapted to be threaded onto the stem beneath the bumper for fixedly securing the stem to the bumper, and a collar about the stem. More particularly, the yieldably urging means comprising springs connecting the collar with the adjacent side of the housing, preferably at the front of the ball, and a cover is releasably connected to the housing to extend above the springs.

In accordance with another novel aspect of the present invention, the bottom wall of the housing has an elongated opening through which the ball stem extends, the ball is yieldably urged in a direction away from the end wall, and a means is provided for fixedly locating the ball stem in a shifted position toward the end wall, thus enabling the mounting of tongues with different spacing between its end and the socket. Preferably, the ball is urged away from the end wall by suitable arrangement of the springs which urge the housing to rotate in opposite directions about the stem. As illustrated, the ball is located in a desired longitudinal position by a shim insertible between the stem and end of the elongated hole.

In accordance with still another novel feature of the present invention, the housing has at least two holes in each side wall opposite corresponding holes in the other side wall, with each pair of opposing holes being arranged to receive a bar therethrough in a selected position over and sufficiently close to the top of the tongue to prevent its detachment from the ball. Thus, for example, the two pairs of holes may be at different positions lengthwise of the housing, or at different heights, or both. Also, of course, there may be more than two pairs of such holes.

In the drawings, wherein like reference characters are used throughout to designate like parts:

FIG. 3 is a top plan view of the guide assembly showing the housing in its neutral position with its end wall longitudinally aligned with axis of the ball stem;

FIG. 4 is a view similar to FIG. 3, but upon engagement of the inner end of the tongue, shown in broken lines, with the one side wall of the housing to rotate it to a position in which the end of the tongue will continue to slide over the side wall into a position above the ball for attachment thereto, as shown in FIGS. 1 and 2;

FIG. 5 is a horizontal sectional view of the guide assembly, as seen along broken lines 5—5 of FIG. 2;

FIG. 6 is a view similar to FIG. 5, with the ball stem fixed in a rearwardly disposed position to cause the end of the tongue to be closer to the end wall of the housing upon attachment to the ball;

Figure 1:
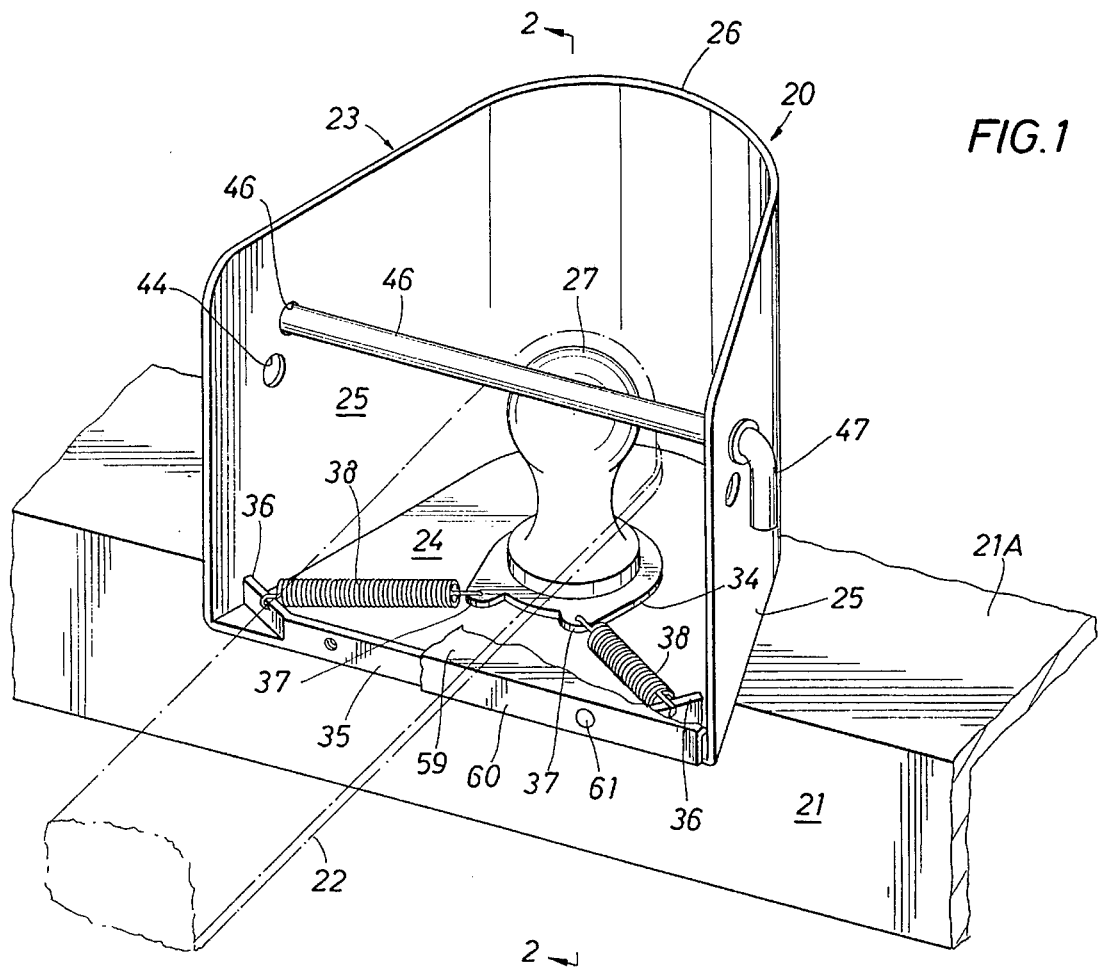
FIG. 1 is a perspective view of a guide assembly constructed and mounted on the bumper of a towing vehicle in accordance with an illustrated embodiment of the present invention, with the tongue of the towed vehicle shown in broken lines and having a socket on its inner end in place over the ball of the assembly to attach the towed vehicle to the towing vehicle.

With reference now to the details of the above-described drawings, the guide assembly, indicated in its entirety by reference character 20, is best shown in FIG. 1 to be mounted on the bumper 21 of a towing vessel in position to permit the attachment of the tongue 22 of a towed vessel (not shown) to the towing vessel. The bumper may be of conventional construction having a flat surface 21A on which hitches are conventionally mounted for disposal rearwardly of the tail gate or other vertical rear wall (not shown) of the towing vehicle.

As previously described, the guide assembly includes a housing 23 having a bottom wall 24 supported on the horizontal wall 21A of the bumper and a pair of upstanding side walls 25 which diverge rearwardly to an end wall 26 opposite the open front of the housing. The side and end walls may be secured to the bottom wall by welding or other means.

Figure 2:
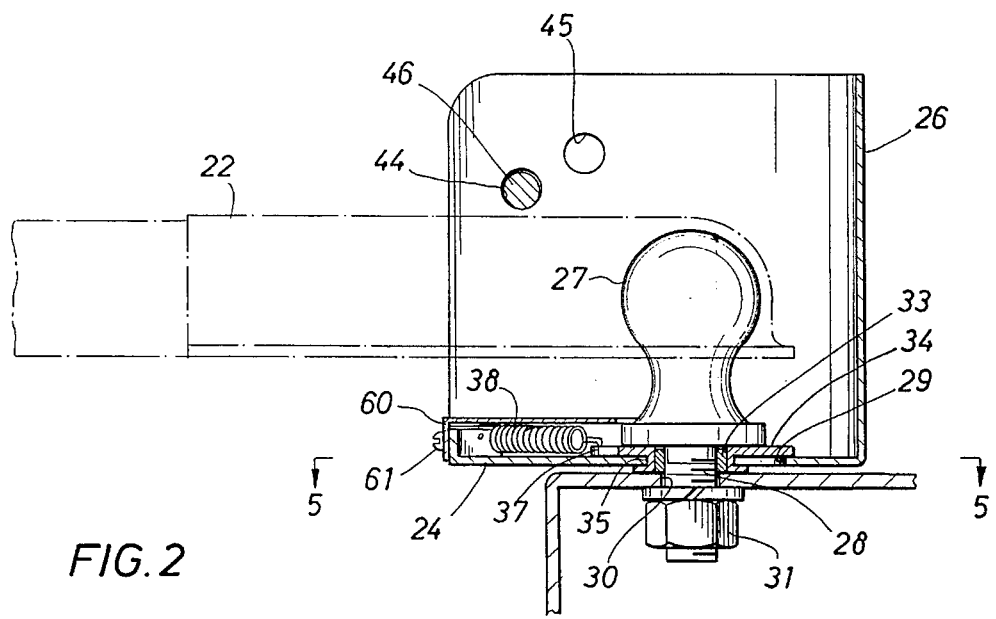
FIG. 2 is a vertical sectional view of the guide assembly and bumper, as seen along broken lines 2—2 of FIG. 1.

The guide assembly further includes a ball 27 of a size contoured to fit a socket at the end of the tongue 22 of the towed vehicle, as best shown in FIG. 2. More particularly, a threaded stem 28 on the lower end of the ball extends through an elongated hole 29 of the bottom wall 24 of the housing as well as a hole 30 in the horizontal wall of the bumper, and a nut 31 is threaded over the stem beneath the bumper to affix the ball in its mounted position within the housing. As well known in the art, as the tongue is moved into the housing, its end slides over the ball to permit its socket to move downwardly onto the ball, as shown, so that, as well known in the art, it may be attached to the ball by a coupling of some type (not shown).

The ball stem is surrounded by a bearing sleeve 33 supported on the top wall of the bumper and a collar 34 which surrounds the sleeve and projects outwardly from the stem. As best shown in FIG. 2, the collar has an annular recess 35 about it which fits closely within the elongated slot 29 in the bottom wall of the housing, whereby the housing is longitudinally movable lengthwise of the bumper and ball so that it may be fixedly mounted in adjusted positions with respect to the ball. For example, the housing may be fixed in a rearward position with respect to the ball, as shown in FIG. 2, or, as shown in FIG. 6, in a forward position with respect to the ball. The manner of fixing the ball in these alternate positions, or other longitudinal positions between them, will be understood from the description to follow.

The housing has a flange 35 which is secured to the bottom wall of the housing 24 for extension across the front end thereof and which has rearwardly extending wings 36 at each end. The collar has ears 37 on its front end and each of the ears and wings have holes to receive opposite ends of a tension spring 38. The tension springs are of the same size and spring rate so as to normally urge the collar and thus the housing to a "neutral" position, as shown in FIG. 1, wherein the rear wall is aligned with the ball.

Upon attachment of the tongue of the towing vehicle to the ball, the housing will assume its neutral position as long as the towing and towed vehicles are in alignment with one another. Obviously, however, in attaching the towed vehicle, it is not always possible to align its tongue with the guide assembly. More likely, they are mis-aligned, so that, as the tongue is moved forwardly toward the guide assembly, it will engage the inner side of one of the side walls. Thus, for example as shown in FIG. 4, the tongue will engage and slide forwardly along the left-hand side wall. The housing is then free to turn or rotate with respect to the ball due to the expansion of the left-hand spring 28. However, continuing forward movement of the tongue will cause the towed vehicle to be forced by the left-hand spring toward alignment with the towing vehicle until the socket slides over the upper side of the ball so that it may be coupled thereto.

It will further be understood that turning of the towed and towing vehicles with respect to one another, such as might occur as the towing vehicle begins a sharp turn relatively to the towing vehicle, may swing the end edge of one of the side walls against the side of the tongue. For example, in the event the towing vehicle is turned to the right, as shown in FIG. 1, the right-hand spring 38 will be stressed to permit the housing to rotate in a left-hand direction with respect to the ball, thus again permitting relative movement of the housing and bumper which avoids damage to the guide assembly.

Figure 7:
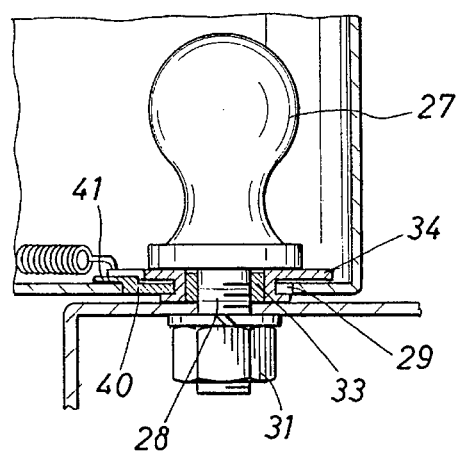
FIG. 7 is a vertical sectional view of the guide assembly, as seen along broken lines 7—7 of FIG. 6.
Figure 8:
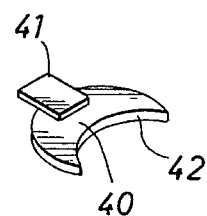
FIG. 8 is a perspective view of the shim which is disposable between the stem and elongated slot in the bottom wall of the housing to hold the stem in its adjusted position.

The direction of force of the springs 38 will normally maintain the ball in a forward position with respect to the open end of the housing with the collar engaged with the front edge of opening 29. However, in the event that the vertical wall (not shown) of the bumper recess is too close to the rear wall 26 of the housing, the housing may be moved forwardly with respect to the ball and then fixed in such a relatively forward position. For this purpose, a shim 40 is adapted to be inserted between the front edge of the recess in the collar and the inner end of the elongated slot in the bottom wall of the housing, as shown in FIG. 7.

Thus, the shim has a flange 41 adapted to rest on the top of the bottom wall of the housing just forwardly of the inner end of the opening, and as a inner end 42 contoured to fit the radius of the recess in the collar. Obviously, a number of wedges of different sizes may be provided to permit fixing of the housing in any number of adjusted positions with respect to the ball. It will be appreciated that in order to permit the ball to be moved between adjusted positions, it may be necessary to loosen the nut 31 as the ball stem slides in the slot of the housing.

Each side wall of the housing is provided with a pair of holes 44 and 45 therein, with the holes in the opposite walls being generally aligned with one another. Each of the holes is of a size to receive a bar or rod 46 which extends therethrough and which has a handle 47 on one end to permit it to be manipulated and to prevent its being moved out of the holes in a left-hand direction.

In the illustrated position of the rod 46, it is above and somewhat rearward of the top side of the tongue 22. More particularly, the spacing between the lower side of the rod and the top of the housing is such that it prevents the socket from detaching from the upper side of the ball 27. The disposal of a pair of oppositely disposed openings in the side walls permits the rod to be moved between alternate positions. Thus, when disposed through the holes 44, the rod 46 is closer to the top side of the tongue 22.

Figure 9:
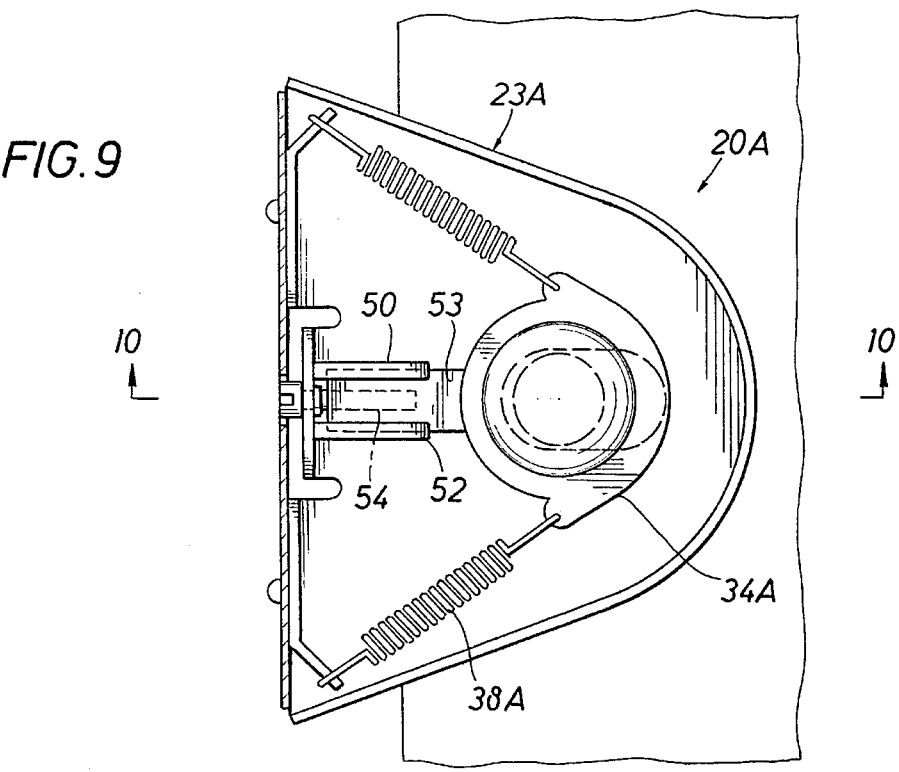
FIG. 9 is a top plan view of an alternative embodiment of a guide assembly constructed in accordance with the present invention, including a modified arrangement for holding the ball stem in an adjusted position longitudinally of the housing.
Figure 10:
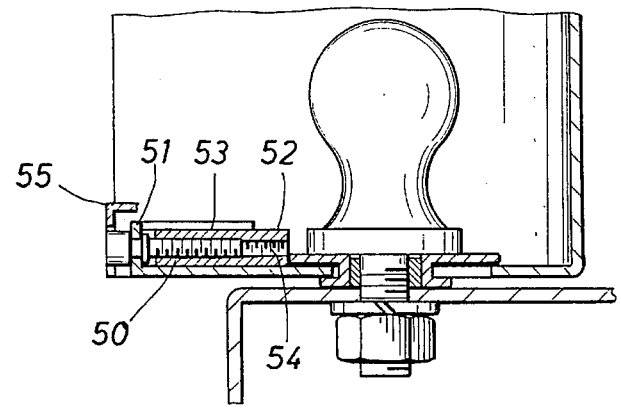
FIG. 10 is a vertical sectional view of the modified guide assembly, as seen along broken lines 10—10 of FIG. 9.

In the alternate embodiment of the guide assembly, which is indicated in its entirety by reference character 20A in FIGS. 9 and 10, the housing 23A may be of quite similar construction to that of the housing 23 of the first embodiment. Hence, various parts of the housing which are identical to those of the housing 23 of the first embodiment are indicated by the same reference character with the suffix "A".

In this embodiment, however, a guide bracket 50 is mounted on an upstanding flange 51 of the bottom wall of the housing and has channels 52 on each side which receive a slide bar 53 having a front end adapted to engage the oppositely facing end of the collar about the ball stem. The guide bar is adapted to be moved forwardly and rearwardly by means of a bolt 53 received within a threaded bolt 54 of the guide bar mounted on a bracket 55 fixed to the flange 35A of the housing. Consequently, manipulation of the left-hand end of the bolt permits it to be turned in one direction or the other for moving the bar 53 forwardly and rearwardly.

As in the case of the first embodiment of the invention, the disposition of the springs 38A is such as to normally move the collar and thus the ball rearwardly to cause the collar to engage the left-hand end of the elongated slot formed in the bottom wall of the housing. However, the forward movement of the bar 53 will effectively move the ball and thus the stem forwardly with respect to the housing, or, conversely, the housing rearwardly with respect to the ball. In this case, of course, the threaded connection between the bar and the bolt 53 will hold the ball in the desired position against the force of the springs 38A.

An upper wall 59 is adapted to be mounted on the housing to extend over the springs 38 and 38A and thus protect them from damage or displacement during attachment and detachment of the tongue. Preferably, this wall extends inwardly beyond the front side of the ball, as shown in broken lines in FIG. 3, and is removably secured to the flange 35 by means of screws 61.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. For use in attaching a towed vehicle having a forwardly extending tongue with a socket at its end to the bumper of a towing vehicle, a guide assembly comprising a ball contoured to fit the socket and adapted to be fixedly mounted on the bumper in position to fit within the socket, a housing having a bottom wall supported on the bumper for rotation about the ball, upstanding, rearwardly diverging walls on opposite sides of the ball, and an end wall at the intersection of the side walls to the rear of the ball, and means attachable to the ball and acting between the ball and the housing to yieldably urge the housing in opposite rotational directions about the vertical axis of the ball, during as well as following attachment of the socket to the ball.

2. As in 1, wherein said ball including mounting means comprising a stem which extends vertically through a hole in the bumper, a nut adapted to be threaded to the stem beneath the bumper for fixedly securing the stem to the bumper, and a collar about the stem, and the yieldably urging means comprising springs each connecting the collar with the adjacent side of the housing.

3. As in 2, wherein the springs extend between the collar and housing at the front of the ball.

4. As in 3, including a cover releasably connected to the housing to extend above the springs.

5. As in claim 1, wherein, said housing having at least two holes in each side wall opposite corresponding holes in the other side wall, with the opposing holes in each side wall being arranged to receive a rod therethrough in a selected position over and sufficiently close to the top of the tongue to prevent its detachment from the ball.

6. For use in attaching a towed vehicle having a forwardly extending tongue with a socket at its end to the bumper of a towing vehicle, a guide assembly comprising a ball contoured to fit the socket and having means including a stem adapted to extend through a hole in the bumper whereby it may be secured to the bumper in position to fit within the socket, a housing having a bottom wall supported on the bumper and having an opening surrounding the ball stem which is elongated to permit the ball stem to be moved toward and away from the end wall of the housing, upstanding, rearwardly diverging walls on opposite sides of the ball, and an end wall at the intersection of the side walls to the rear of the ball, whereby, upon engagement of the side wall of the housing with the tongue, the tongue is forced toward a position in which the socket is over the ball, means yieldably urging the ball stem in a direction away from the end wall, and means for fixedly locating the ball stem in a desired position toward the end wall.

7. As in 6, wherein the locating means comprises a shim insertible between the stem and end of the elongated opening.

8. As in 6, wherein, the bottom wall of the housing is free to rotate about the ball, and the yieldably urging means is arranged to urge the housing to rotate in opposite directions about the stem.

* * * * *